C. A. WOLFE.
WIRE ROPE CLAMP.
APPLICATION FILED MAY 19, 1916.
1,338,062.
Patented Apr. 27, 1920.
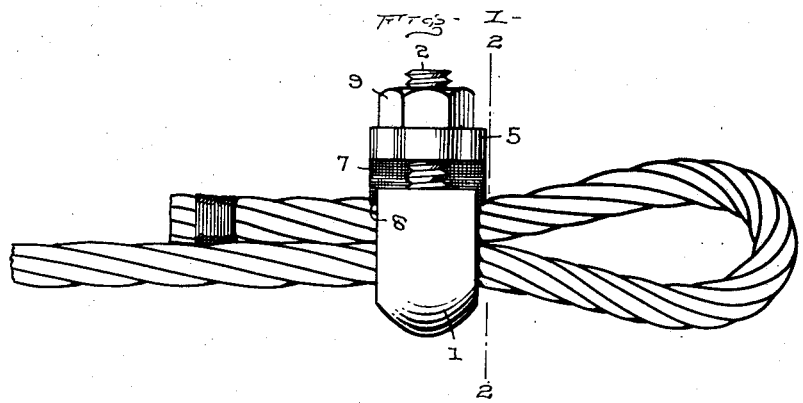
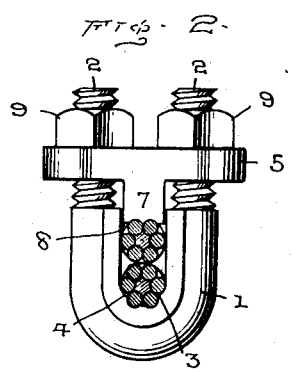
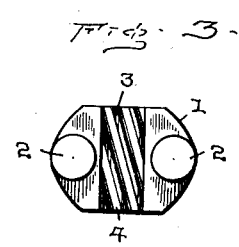
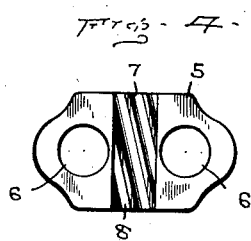
Charles A. Wolfe, Inventor
By Ogle R. Singleton
Attorney

UNITED STATES PATENT OFFICE.

CHARLES A. WOLFE, OF SUEDBERG, PENNSYLVANIA.

WIRE-ROPE CLAMP.

1,338,062.   Specification of Letters Patent.   Patented Apr. 27, 1920.

Application filed May 19, 1916. Serial No. 98,482.

*To all whom it may concern:*

Be it known that I, CHARLES A. WOLFE, a citizen of the United States, residing at Suedberg, in the county of Schuylkill and State of Pennsylvania, have invented certain new and useful Improvements in Wire-Rope Clamps, of which the following is a specification.

My invention consists in a new and useful improvement in wire rope clamps designed for clamping together the ends of ropes or cables or for the purpose of forming loops in the same. My invention provides a device which, while it is composed of the minimum number of parts, provides a maximum of efficiency. From the construction hereinafter described, it will be seen that the novel features of two bearing plates having rectangular faces which are provided with grooves to receive the strands of the cable upon which the device is to be applied, and the provision of bolts integral with one of such faces accomplishes the desired results.

In the drawings:

Figure 1 is a side elevation of the device applied to a cable.

Fig. 2 is a view on line 2—2, Fig. 1.

Fig. 3 is a top view of the lower bearing plate indicated in Fig. 1.

Fig. 4 is a bottom view of the upper bearing plate indicated in Fig. 1.

In the drawings:

The numeral 1 indicates a U-shaped bearing plate provided with the threaded bolts 2, 2 extending from its ends, and a rectangular bearing face 3 which is substantially semi-circular in cross section and has a grooved surface 4 which provides spiral recesses to receive the strands of the cable so that the bearing face firmly grips the cable to prevent it from slipping and at the same time avoids damaging the cable by extreme pressure. A bearing plate 5 is provided at its outer ends with circular orifices 6, 6 adapted to receive therethrough bolts 2, 2, and is also provided with a depending middle portion 7 adapted to fit between the sides of the U-shaped plate 1 and provided with the rectangular bearing face 8 which is identical in construction with the bearing face 3 described above. Nuts 9, 9 are adapted for application to the threaded bolts 2, 2 to bear upon the plate 5 to secure pressure upon the cable between the two bearing plates.

Having described my invention, what I claim is:

The combination, in a wire rope clamp, of one plate, U-shaped in cross section; a rectangular bearing face provided in the crotch of said plate, semi-circular in cross section and corrugated spirally corresponding with the strands of the wire rope to which the clamp is to be applied; threaded stems integral with said plate; a second plate provided at its ends with circular orifices to receive the threaded stems therethrough; a centrally disposed extension formed integral with said second plate, rectangular in cross section; a rectangular bearing face provided upon the extremity of said extension, semi-circular in cross section and corrugated spirally corresponding to the strands of the wire rope to which the clamp is to be applied, and co-acting with said crotch bearing face; and two nuts adapted to co-act with the threaded stems to clamp the two plates upon the wire rope.

In testimony whereof I affix my signature in the presence of two witnesses.

CHARLES A. WOLFE.

Witnesses:
MARY A. SMITH,
HARVEY C. JONES.